(12) United States Patent
James

(10) Patent No.: US 10,995,980 B2
(45) Date of Patent: May 4, 2021

(54) CRYOVIAL STORAGE SYSTEM

(71) Applicant: Sanaria Inc., Rockville, MD (US)

(72) Inventor: Eric R. James, Darnestown, MD (US)

(73) Assignee: Sanaria Inc., Rockville, MD (US)

(*) Notice: Subject to any disclaimer, the term of this patent is extended or adjusted under 35 U.S.C. 154(b) by 85 days.

(21) Appl. No.: 15/957,654

(22) Filed: Apr. 19, 2018

(65) Prior Publication Data
US 2018/0306493 A1    Oct. 25, 2018

Related U.S. Application Data

(60) Provisional application No. 62/487,687, filed on Apr. 20, 2017.

(51) Int. Cl.
| | |
|---|---|
| A01N 1/02 | (2006.01) |
| F25D 31/00 | (2006.01) |
| F25B 19/00 | (2006.01) |
| B65D 21/02 | (2006.01) |
| G01N 1/42 | (2006.01) |
| B01L 9/06 | (2006.01) |
| B01L 7/00 | (2006.01) |
| F25D 25/00 | (2006.01) |

(52) U.S. Cl.
CPC ......... *F25D 31/006* (2013.01); *A01N 1/0257* (2013.01); *A01N 1/0268* (2013.01); *B01L 9/06* (2013.01); *B65D 21/0213* (2013.01); *F25B 19/005* (2013.01); *G01N 1/42* (2013.01); *B01L 7/50* (2013.01); *B01L 2200/025* (2013.01); *B01L 2200/028* (2013.01); *B01L 2300/1894* (2013.01); *F25D 25/00* (2013.01); *F25D 2303/0831* (2013.01); *F25D 2331/804* (2013.01)

(58) Field of Classification Search
CPC .. F25D 31/006; F25D 25/00; F25D 2331/804; F25D 2303/0831; A01N 1/0268; B01L 9/06; B01L 2200/025; B01L 2200/028; B01L 2300/1894; B01L 7/50; G01N 1/42
USPC .................................................. 220/560, 4
See application file for complete search history.

(56) References Cited

U.S. PATENT DOCUMENTS

| | | | | |
|---|---|---|---|---|
| 4,377,077 | A * | 3/1983 | Granlund | A01N 1/02 435/307.1 |
| 4,455,842 | A * | 6/1984 | Granlund | A01N 1/02 62/64 |
| D325,934 | S * | 5/1992 | Ramljak | D11/147 |
| 5,450,977 | A * | 9/1995 | Moe | B65D 88/022 220/1.5 |
| D364,929 | S * | 12/1995 | Bigler | D24/230 |

(Continued)

*Primary Examiner* — Ernesto A Grano
(74) *Attorney, Agent, or Firm* — Sterne, Kessler, Goldstein & Fox P.L.L.C.

(57) ABSTRACT

A cryovial storage system is provided for use in LNVP storage and transportation freezers. The system comprises a hexagonal box that can be used modularly in both vertical and horizontal dimensions to more efficiently fill the functional space within cryogenic freezers and dry shippers. Also provided is a canister and insert system configured to receive a stack of hexagonal boxes (or multiple stacks of hexagonal boxes) and a method for accessing only the topmost box in a stack while retaining the other boxes in the stack below and a system that provides ease of transferability of boxes between storage freezers and dry shippers.

27 Claims, 14 Drawing Sheets

(56) References Cited

U.S. PATENT DOCUMENTS

| | | | | |
|---|---|---|---|---|
| 5,934,099 A * | 8/1999 | Cook | | A61J 1/165 206/570 |
| 6,044,650 A * | 4/2000 | Cook | | A61J 1/165 62/130 |
| 7,540,168 B2 * | 6/2009 | Schumann | | A01N 1/02 62/378 |
| D599,675 S * | 9/2009 | Premo | | D9/687 |
| D615,450 S * | 5/2010 | Cherem | | D11/143 |
| 8,770,907 B2 * | 7/2014 | Yoshimura | | A01N 1/0263 220/560.12 |
| 8,887,944 B2 * | 11/2014 | Deane | | B65D 81/3802 206/499 |
| 9,371,169 B1 * | 6/2016 | Petrucci | | B65D 81/3832 |
| 9,534,992 B2 * | 1/2017 | Schryver | | G01N 1/42 |
| D865,211 S * | 10/2019 | Yu | | D24/224 |
| 2002/0046567 A1 * | 4/2002 | Pelloux-Gervais | | F17C 1/16 62/45.1 |
| 2004/0159568 A1 * | 8/2004 | Rutledge | | B65D 81/18 206/438 |
| 2006/0196193 A1 * | 9/2006 | Byrne | | B01L 9/06 62/62 |
| 2006/0261060 A1 * | 11/2006 | Baez | | B65D 11/1873 220/4.21 |
| 2007/0246381 A1 * | 10/2007 | Pond | | B65D 51/221 206/222 |
| 2008/0128478 A1 * | 6/2008 | Quadrelli | | B65D 5/6608 229/110 |
| 2010/0032328 A1 * | 2/2010 | Gillain | | B65D 85/305 206/427 |
| 2011/0111938 A1 * | 5/2011 | Smith | | B65D 5/0227 493/162 |
| 2011/0120148 A1 * | 5/2011 | Yoshimura | | A01N 1/0257 62/51.1 |
| 2011/0308271 A1 * | 12/2011 | Schryver | | A01N 1/0263 62/465 |
| 2013/0091890 A1 * | 4/2013 | Schryver | | B65D 81/38 62/440 |
| 2013/0263622 A1 * | 10/2013 | Mullen | | F25D 11/003 62/451 |
| 2014/0077105 A1 * | 3/2014 | Kawahara | | G21F 5/015 250/507.1 |
| 2016/0052702 A1 * | 2/2016 | Lawrie | | B65B 67/02 211/85.24 |
| 2016/0135447 A1 * | 5/2016 | Visinoni | | A01N 1/0284 435/366 |
| 2016/0152372 A1 * | 6/2016 | Kelly | | B65D 5/68 229/110 |
| 2016/0347499 A1 * | 12/2016 | MacHin | | B65D 5/40 |
| 2018/0222639 A1 * | 8/2018 | Russell | | B65D 41/3442 |

* cited by examiner

CRYOVIAL STORAGE SYSTEM

CROSS-REFERENCE TO RELATED APPLICATIONS AND INCORPORATION BY REFERENCE

This non-provisional application claims priority to U.S. Provisional Application No. 62/487,687, filed Apr. 20, 2017, which is incorporated herein by reference in its entirety for all purposes.

FIELD OF THE INVENTION

This application relates generally to systems and devices for storage, organization and distribution of vials for cryopreserved material and the clinical access and use of vials in LNVP storage.

BACKGROUND

Cryopreservation (Kryos=frost, Greek; preservation=to protect, maintain safe) is a process as applied to biological materials where cells or other biological entities are preserved by cooling to very low temperatures (typically −80° C. in solid carbon dioxide or mechanical freezers, or −196° C. using liquid nitrogen). To avoid both the risk of cross-contamination of samples stored in liquid nitrogen or explosion during thawing resulting from rapid expansion of liquid nitrogen trapped inside the sample container, liquid nitrogen vapor phase (LNVP) technology is preferred (Morris, G. J. 2005 Cryobiology 50:231; Fountain, D., et al. 1997 Transfusion 37:585; https://en.wikipedia.org/wiki/Liquid_nitrogen). LNVP provides storage temperatures below −150° C. LNVP storage below −150° C. is recommended, and in many cases required, for injectable clinical products such as human cellular therapies and vaccines. Temperatures ranging between −150° C. and −196° C. (the boiling point of liquid nitrogen at standard pressure) can easily be maintained using carefully controlled LNVP technology. The cryogenic freezers that utilize LNVP technology typically hold $LN_2$ underneath the product storage compartment or in a jacket composed of an additional vessel wall (such vessels are of triple-walled construction similar to dry shippers). Because the insulation in cryogenic containers (LNVP storage tanks and dry shippers) is a vacuum, engineering design dictates that such vessels are circular in cross section.

Containers: In current practice, samples to be cryopreserved are commonly placed in cryovials, usually constructed of extruded or injection-molded polypropylene or other plastic, the cryovials are typically placed into a box of a square or rectangular configuration, and the boxes are placed on shelves in a vertical rack within the storage compartment of a cryogenic freezer. Cryogenic freezers typically hold the refrigerant $LN_2$ in a jacket (i.e. triple-walled) surrounding the storage compartment in a manner similar to a dry shipper (see below), or that holds the $LN_2$ refrigerant beneath the storage compartment where the samples are stored.

Standard cryovials are ~12.5 mm in diameter and of varying heights to accommodate various working storage volumes, typically 2.0 mL in volume. Standard cryovials are usually stored and organized in square boxes with an internal square matrix designed to keep the vials upright, and that accommodate 25 (5×5), or 81 (9×9) or 100 (10×10) cryovials. A second common format is the ~8.5 mm diameter cryovial. These smaller diameter cryovials are typically arranged and stored in a rectangular SBS (Society for Biomolecular Screening) format of 96 (8×12). The SBS format is a common standard for laboratory automation, including liquid handling. These smaller cryovials are available in a variety of heights for a range of working volumes—the most common are ~0.7 mL and ~1.2 mL nominal capacities.

Dry Shippers:

Cryopreserved products or samples contained in cryovials are transported between sites using LNVP dry shippers. Dry shippers and "isothermal" $LN_2$ vapor phase (LNVP) storage freezers are triple-walled vessels. Between the outer and middle wall is a vacuum that provides thermal insulation. The $LN_2$ refrigerant is contained between the middle wall and the inner wall. In the case of dry shippers this space also contains absorbent material that retains the $LN_2$ refrigerant, and when operational, all the $LN_2$ is drawn into the absorbent material such that there is no free liquid $N_2$ remaining and the shipper is 'dry'. The inner wall of LNVP freezers and dry shippers surrounds the central cylindrical payload compartment. In small dry shippers the payload compartment is commonly used in conjunction with one removable cylindrical canister, which is used to hold canes onto which a single column of standard cryovials are individually clipped. A small dry shipper with a 91 mm diameter payload compartment (typically holding a 70 mm diameter canister) may hold up to 14 canes in sleeves (which prevent the canes from interfering with each other inside the canister), each with 6 standard 2.0 mL cryovials (total 84 cryovials). There is no similar system commercially available for holding and transporting the smaller ~8.5 mm diameter cryovials with nominal volumes of ~0.7 mL or ~1.2 mL. Larger dry shippers typically have a payload compartment that is ~210 mm in diameter that will accept the square (containing 81 standard cryovials), or rectangular SBS-format (containing 96 8.5 mm diameter cryovials) boxes. Typically up to 5 square boxes (containing 405 standard cryovials) or 6 rectangular boxes (containing 576 of the 0.7 mL 8.5 mm diameter cryovials) can be packed into the payload compartment of this dry shipper.

The static hold time (the time that a dry shipper can hold a payload below −150° C.) is a function of its capacity both for refrigerant and payload, the efficiency of the vacuum insulation, the size of the neck tube leading into the payload compartment (a narrower neck tubes provides a slower rate of refrigerant evaporation), and the frequency with which the payload compartment is accessed to remove samples or product.

Packaging: Cryogenic LNVP freezers and dry shippers are typically cylindrical in design whereas the boxes, within which the standard cryovials and SBS-formatted cryovials are stored, are typically square or rectangular.

Hence one problem with shipping in these square or rectangular boxes in the cryogenic freezers and larger format dry shippers in accordance with conventional approaches is an inefficient use of the payload space as a result of the unused space between the quadrilateral boxes and the circular wall of the freezer or shipper storage compartment. Shipping of the 8.5 mm diameter cryovials in the small dry shippers is also problematic in that it requires placement of the cryovials into smaller boxes than those commercially available for storage, and which are also an inefficient geometry, or alternatively, it requires the use of canes, upon which cryovials are clipped; however, canes are cumbersome for removal, particularly if it is desirable to remove only one cryovial at a time. Similarly, storage of boxes of cryovials in LNVP freezers according to conventional practice typically uses square or rectangular racks that accommodate multiple boxes on shelves arranged vertically. The storage compartments of LNVP freezers are cylindrical and, thus, there is much wasted space when racks of square or rectangular boxes are stored. Additionally, in order to maintain the consistency of low temperature during transfer of samples from cryogenic freezers to dry shippers it is advantageous to use the same boxes or racks, each containing a multiplicity of vials, in both the LNVP storage freezer and the dry shipper.

BRIEF SUMMARY

Embodiments of the invention provided herein solve one or more of the above identified problems and include an efficient system for storage of cryovials in cryogenic freezers, an efficient system for transporting the cryovials in dry shippers, and a system for easily removing vials one at time from a dry shipper, during clinical use. Embodiments of the invention also facilitate integration between storage and transportation such that both storage and transportation are rendered more efficient than by using conventional means, and the transfer from storage cryogenic freezers to dry shippers becomes seamless, more efficient and amenable to automation than by using conventional means.

Furthermore, when dry shippers are used at clinical sites for both local storage and for retrieval of product for use, the system of the present invention provides a user-friendly method for access to individual cryovials while maintaining the essential below −150° C. LNVP temperature of the remaining cryovials.

DRAWINGS

SUMMARY

Figure 1A:
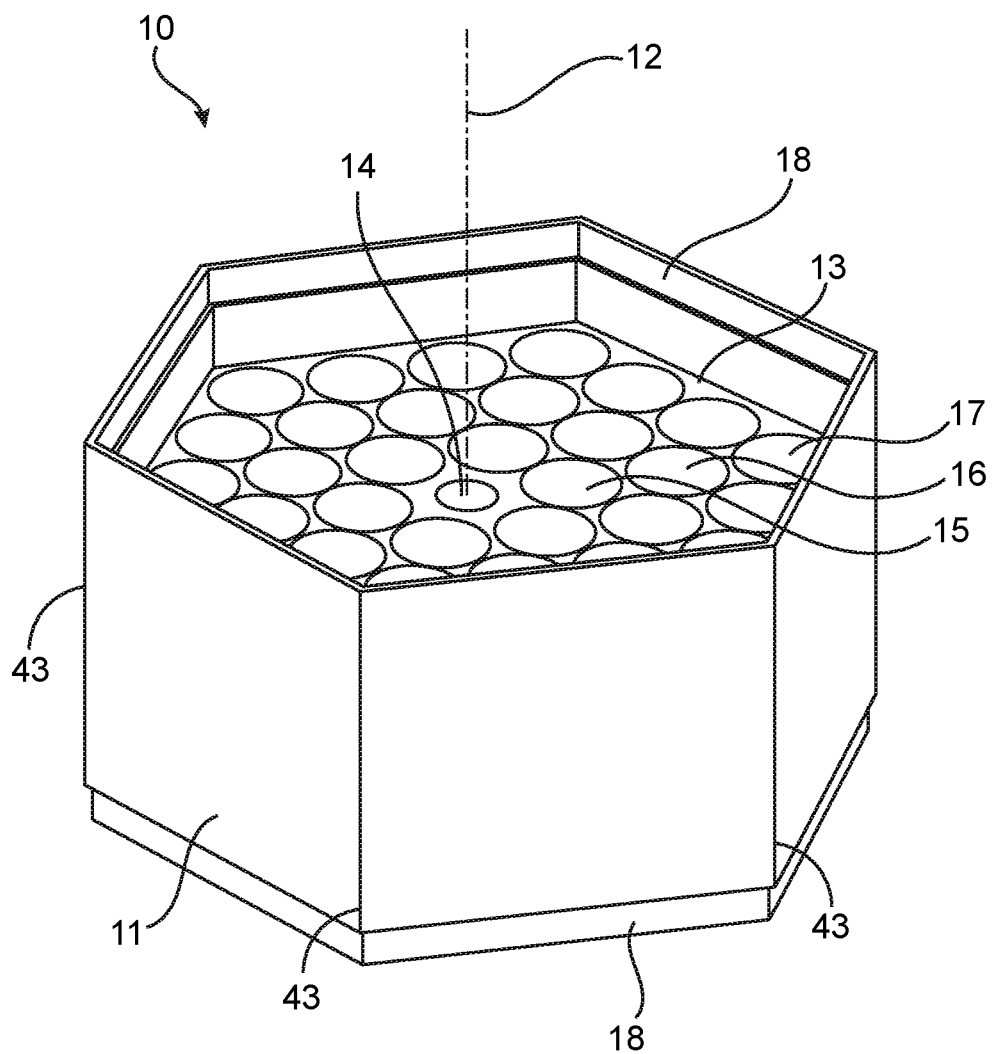
FIG. 1A is a perspective view from the top of a hexagonal box showing an interior frame with a central hole and three concentric rings of holes adapted to receive thirty six cryovials.
Figure 1B:
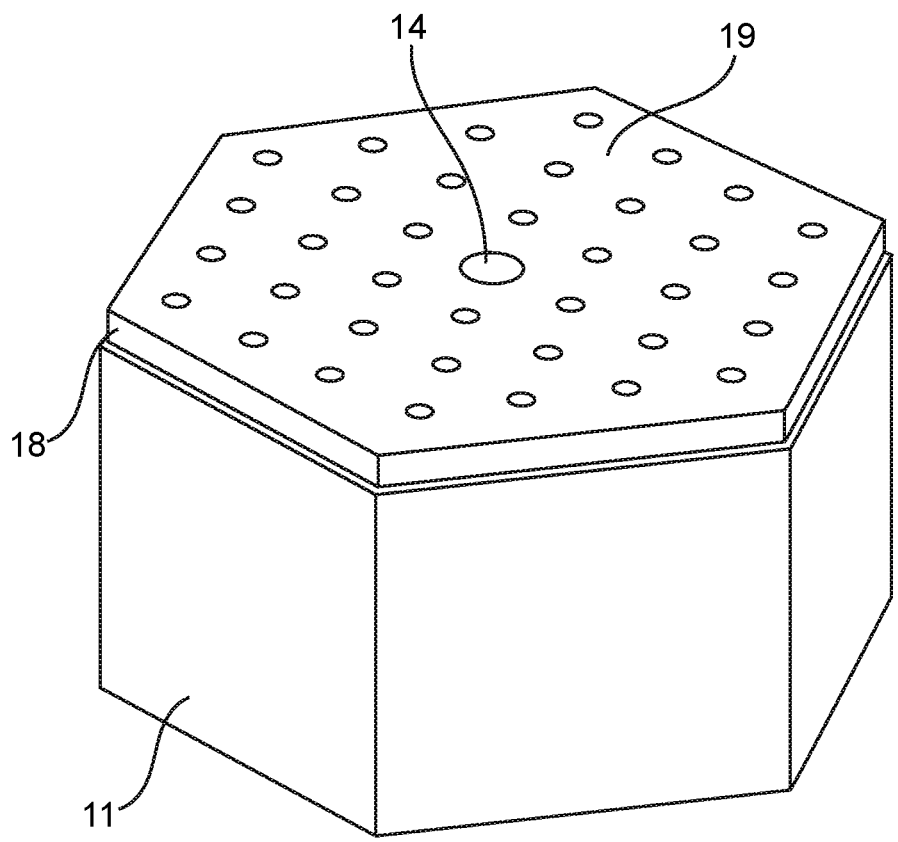
FIG. 1B is a perspective view from the bottom of a hexagonal box.
Figure 1C:
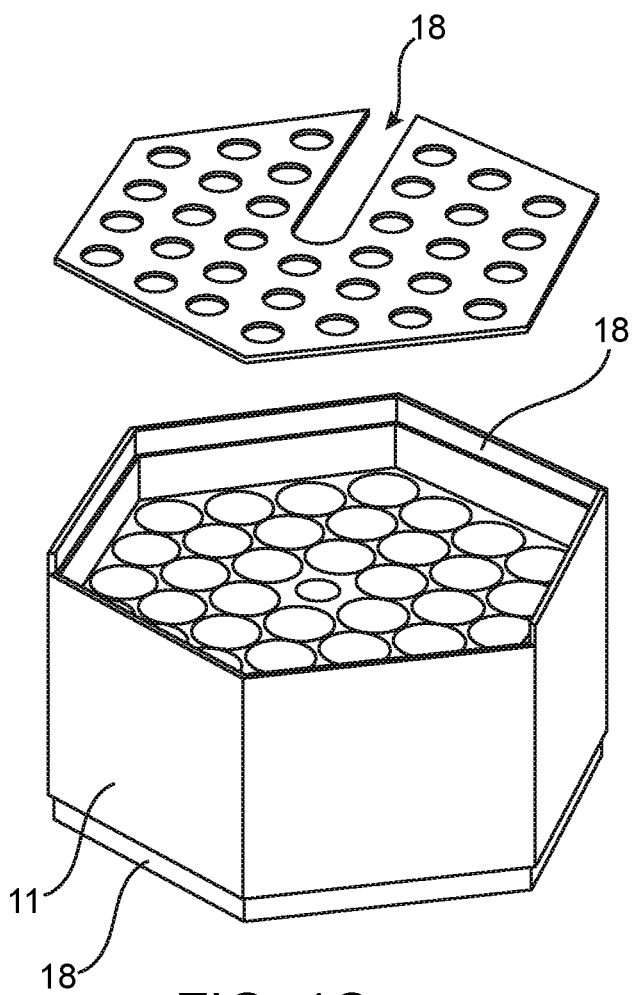
FIG. 1C shows a top in relation to a hexagonal box.
Figure 1D:
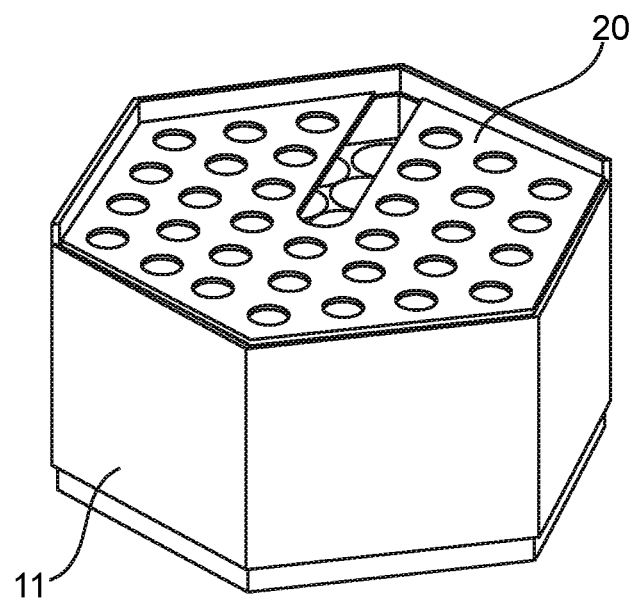
FIG. 1D shows a hexagonal box with a top in place.

A highly efficient cryovial storage system is provided. The system comprises one or more stackable hexagonal boxes for organizing vials within a cryogenic freezer or a dry shipper and configured to maximize the cross-sectional density of vials stored within the cryogenic freezer or dry shipper as compared to conventional storage systems. The hexagonal box has an open top end and a closed bottom end and six intersecting sides there between, each side of equivalent dimension. The box further comprises an internal frame with a central vertical axis parallel to the sides of the box, and may have a central hole along the axis adapted to receive a rod. An array of holes is arranged around the center and adapted to hold cryovials of a given diameter, the holes of the array ordered in one or more concentric rings, each concentric ring from innermost to outermost comprising increasing numbers of holes starting at 6, and increasing by 6 in each concentric ring. The hexagonal box organizes the placement of the vials within a cryogenic freezer or dry shipper so as to maximize the density of vials stored within the box and the freezer/shipper, improving upon the storage density available with conventional storage systems.

In an embodiment, the system additionally comprises one or more canister(s) with an open top end a closed bottom end, and a wall there between, the canister wall having a cylindrical or hexagonal cross-section, and dimensioned such that a multiplicity of hexagonal boxes can be stacked in a single column within the canister and wherein the sides of the box(es) are in a close proximity to the canister wall and the central axis of each box in the stack is along the central axis of the canister.

In an embodiment, the system additionally comprises a canister insert, the insert comprising a base with a center and adapted to fit within the canister parallel to the closed bottom of the canister, and additionally comprising a rod affixed to the center of the base and extending upward along the central axis of the canister and perpendicular to the base.

In an embodiment a multiplicity of hexagonal boxes is stacked on the insert with the rod of the insert passing through the central hole of each box in the stack and the insert and boxes placed within a canister. Raising and lowering the insert within the canister consequently raises and lowers the hexagonal boxes stacked on the insert.

In an embodiment, the canister is hexagonal and the top of the canister is castellated.

In an embodiment a method of removing vials from the topmost hexagonal box of a stack of hexagonal boxes on an insert in a castellated hexagonal canister is provided comprising:

a. raising the rod vertically thereby lifting the stack such that the bottom of the topmost hexagonal box in the stack is above the top end of the canister;

b. rotating the topmost hexagonal box around the rod such that each of the intersecting sides of the topmost box rests above a notch on the top edge of the hexagonal canister;

c. lowering the stacked hexagonal boxes below the topmost hexagonal box back into the canister thereby lowering the topmost box to rest within the notches of the canister; and d. removing vials from the topmost first hexagonal box.

DETAILED DESCRIPTION

Definitions

As used herein, a vial is a small container with a closure. Vials are used to hold samples or pharmaceutical products and may be made of glass or plastic, including most typically polypropylene.

As used herein, a cryovial is a container with closure, and used for cryogenic storage of samples or pharmaceutical products. Cryovials are typically made of plastic, most typically polypropylene, and designed to withstand the changes in temperature and pressure experienced by LNVP storage.

As used herein, a dewar is a double-walled cylindrical container used for holding and transporting refrigerated liquids, most usually liquid nitrogen. The space between the outer and inner walls is gas evacuated and the vacuum functions to insulate the contents of the container. Smaller versions may typically be referred to as 'vacuum flasks' or 'Thermos flasks'

$LN_2$ is an abbreviation for liquified nitrogen, at or below its boiling point of −196° C. at Standard Pressure.

LNVP is an abbreviation for liquid nitrogen vapor phase—the refrigerated vapor environment that exists above $LN_2$ or that is retained within a dry shipper at temperatures of −150° C. or below.

As used herein, a dry shipper is a container configured to ship samples while maintaining LNVP temperatures and conditions. The shipper has an insulating vacuum between its outer and middle walls. Between the middle and inner walls an absorbent material is utilized to absorb the $LN_2$ that is introduced into the dry shipper so that no residual $LN_2$ remains inside the payload compartment of the dry shipper.

As used herein, a cryobank is a LNVP cryogenic freezer configured for storage of samples while maintaining LNVP temperatures and conditions.

As used herein, castellated refers to the design of a canister edge that comprises spaced notches.

As used herein, a hexagonal canister refers to a canister with a hexagonal cross sectional geometry and a circular canister refers to a canister with a circular cross sectional geometry.

Figure 3A:
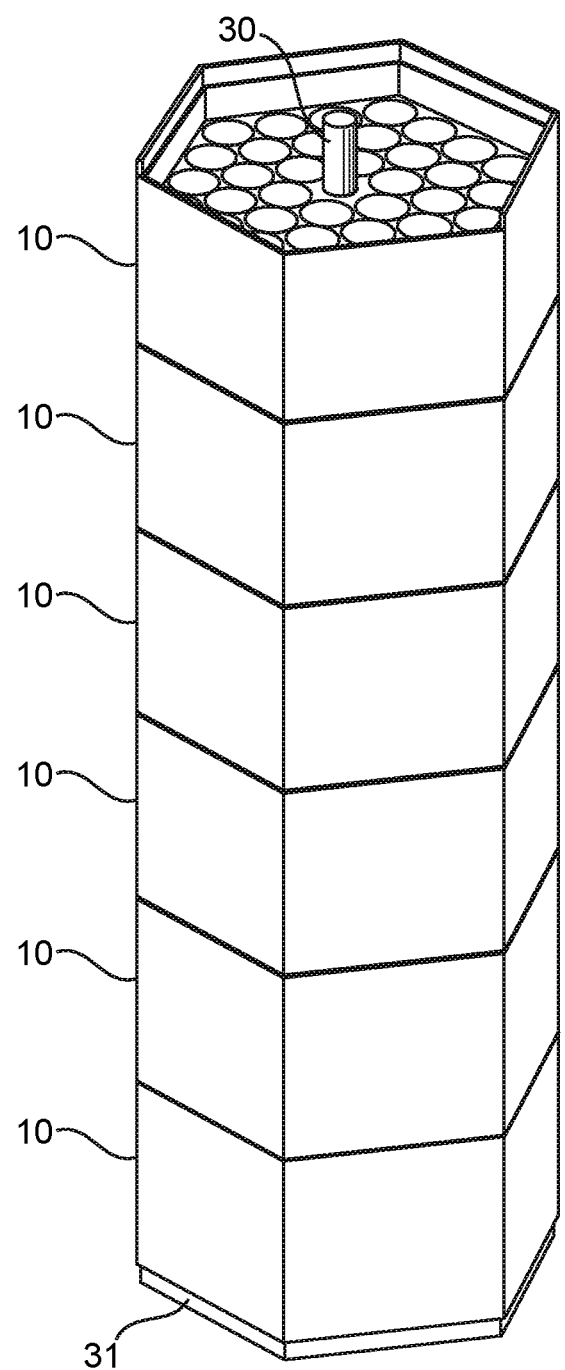
FIG. 3A is a perspective view of a stack of six hexagonal boxes on a canister insert.
Figure 3B:
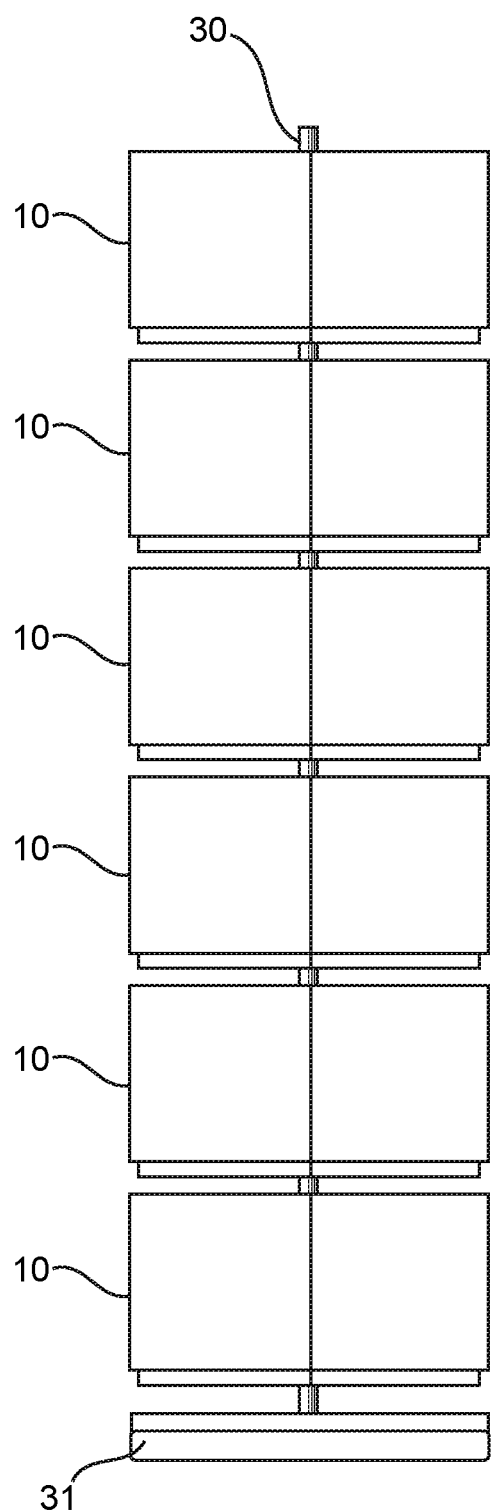
FIG. 3B is a side view of 6 hexagonal boxes spaced on the rod of a canister insert.
Figure 6:
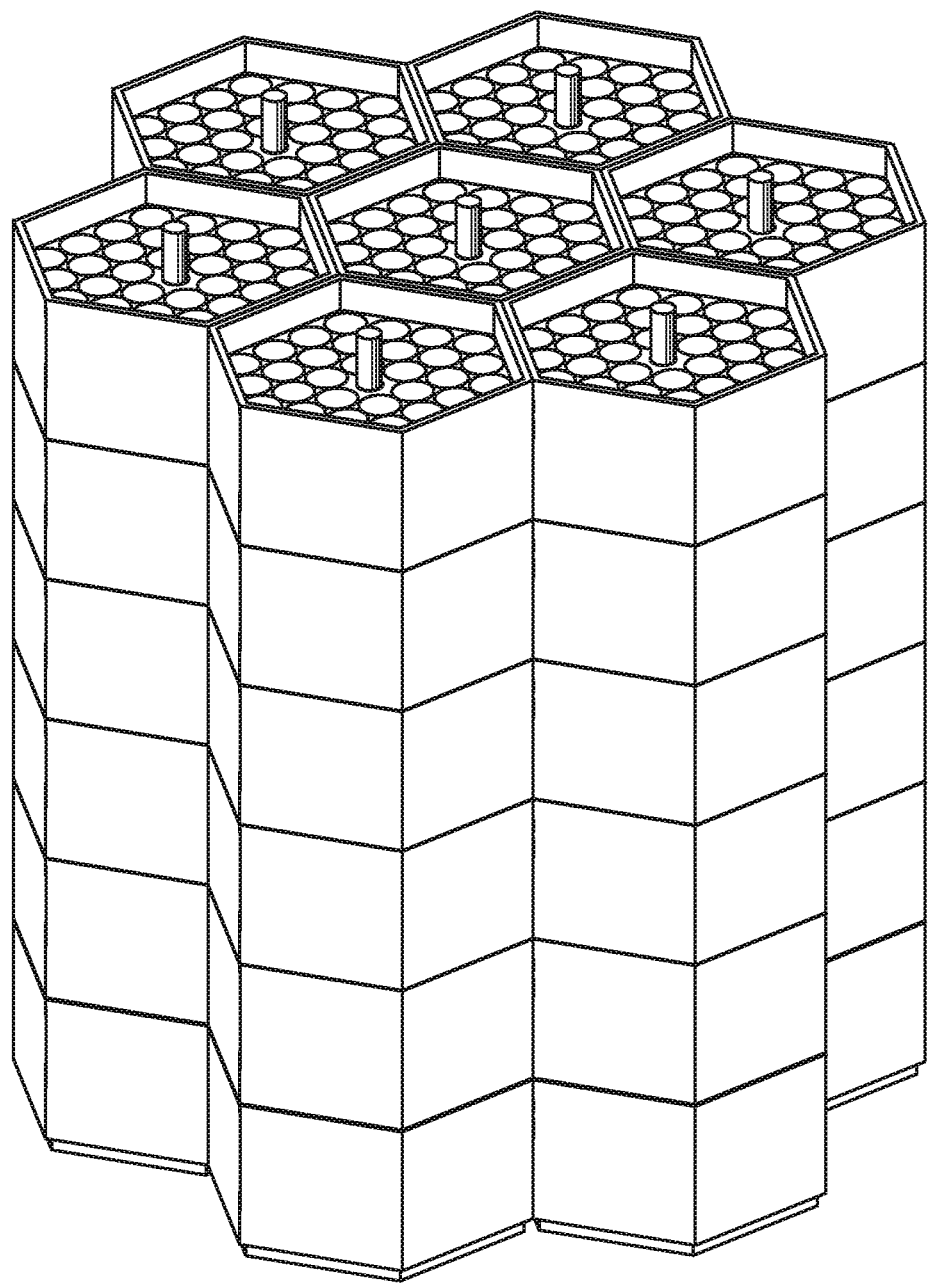
FIG. 6 is a perspective of an arrangement of seven stacks of six hexagonal boxes per stack arranged horizontally.

As used herein and with regard to cryovial storage, efficient refers to an increased density of cryovials within a cross-sectional geometry as compared to conventional cryovial storage systems. Hexagonal boxes can be used individually, stacked as shown in FIG. 3, or positioned side by side in concentric rings of boxes as shown in FIG. 6 to more fully occupy a given three dimensional space in a cryogenic freezing unit than is achievable by conventional storage systems, and providing maximized efficiency thereby.

As used herein a cane is an open-sided rod designed to hold a single column of cryovials by removably coupling them to the rod.

A highly efficient cryovial storage system is provided. LNVP cryobanks and dry shipper cryogenic units have a circular cross-sectional configuration. Such circular configuration maximizes the strength of the walls enclosing the vacuum insulation, and also minimizes vertical seams in the walls, and maximizes thermal efficiency. The cryovial storage system of the present invention provides a more efficient storage configuration for cryovials than the square and rectangular boxes currently used, both by minimizing the unused storage space in the cross-section and by holding the cryovials in a higher density honeycomb format. Standard cryovials are usually stored and organized in square boxes with an internal square matrix designed to keep the vials upright, and that accommodate 25 (5×5), or 81 (9×9) or 100 (10×10) cryovials. This is an inefficient geometry since the boxes are stored or transported in cryogenic freezers or dry shippers that are circular in cross section. The system of the present invention comprises one or more improved stackable hexagonal boxes for organizing vials within a cryogenic freezer or a dry shipper and configured to maximize the cross-sectional density of vials stored therein.

Hexagonal Box—

As shown in FIGS. 1 to 6, the hexagonal box [10] is a modular unit of the system. Referring to FIG. 1A, the box [10] has an open top end, six vertical sides [11] of equal dimension that intersect forming 6 corners [43]. The box comprises a frame [13] interior to the sides of the box with a central axis [12] parallel to and equidistant from each of the intersecting sides, a hole along the central axis and through the box adapted to receive a rod, and an array of holes parallel to the central axis, each hole adapted to hold a cryovial of a given diameter. The holes are arrayed around the central axis in one or more concentric rings [15, 16, 17], each concentric ring from a first innermost to an n outermost comprising an increasing number of holes, i.e., the first ring comprises 6 holes, the second ring comprises 12 holes, the third ring comprises 18 holes, and n ring comprises 6n holes. As used herein, the "*" denotes multiplication. For a box with n concentric rings, the total number of holes within the concentric rings adapted to receive a cryovial equals 3*n*(n+1). In FIG. 2A, an example of a frame with 1 concentric circle and holes adapted to receive 6 cryovials is provided. In FIG. 2B an example of a frame with 2 concentric circles and holes adapted to receive 18 cryovials is provided. In FIG. 2C an example of a frame with 3 concentric circles and holes adapted to receive 36 cryovials is provided. When cryovials are placed within the box, the frame serves to keep the cryovials in an orderly array and in an upright orientation. As shown in FIG. 1B, the hexagonal box additionally comprises a bottom [19] affixed to the box, that serves to retain the vials placed within the box. In an embodiment the bottom is perforated to promote passage of the $LN_2$ vapor into the hexagonal box and in contact with and between the cryovials. The bottom edges of each side of the box are indented [18] to promote the secure stacking of the hexagonal boxes as shown in FIG. 3A. The indented base [18] of a topmost hexagonal box in a stack is configured to fit within the top edge of an inferior box, and thus form a conjoined stack. As shown in FIGS. 1C and 1D, the top edges of the sides of the hexagonal box may be adapted [18] to receive a lid [20] covering the top end of the box. The lid may be provided with a slot [21] adapted to fit around a central insert rod (discussed below). When the lid is in place on a box filled with cryovials, it retains the cryovials within the box and provides the opportunity to provide an identification label and a tamper-monitoring seal.

Figure 2A:
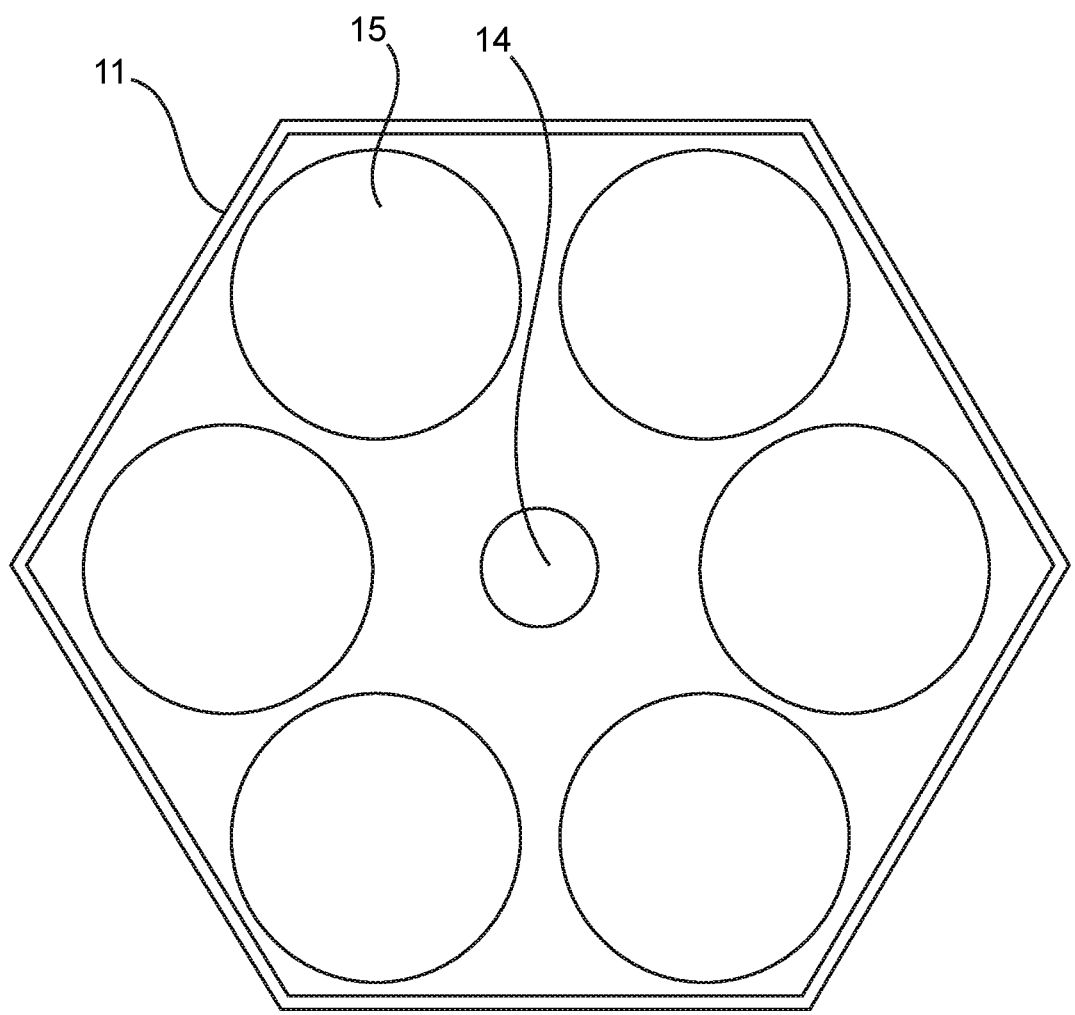
FIG. 2A is a top view of an arrangement of holes in a frame with a central hole and one ring of holes adapted to receive six vials
Figure 2B:
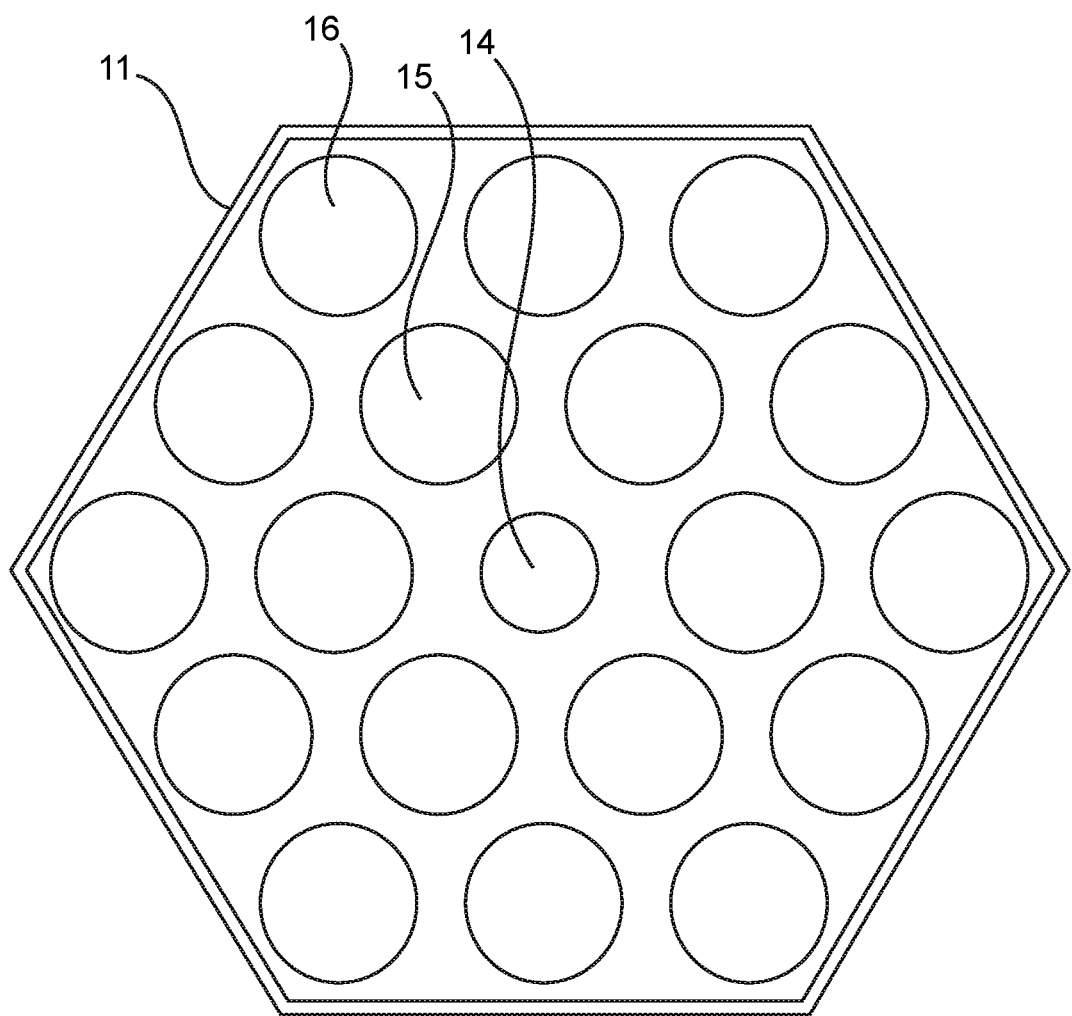
FIG. 2B is a top view of a hexagonal box with an arrangement of holes in a frame with a central hole and two concentric rings of holes adapted to receive eighteen vials.
Figure 2C:
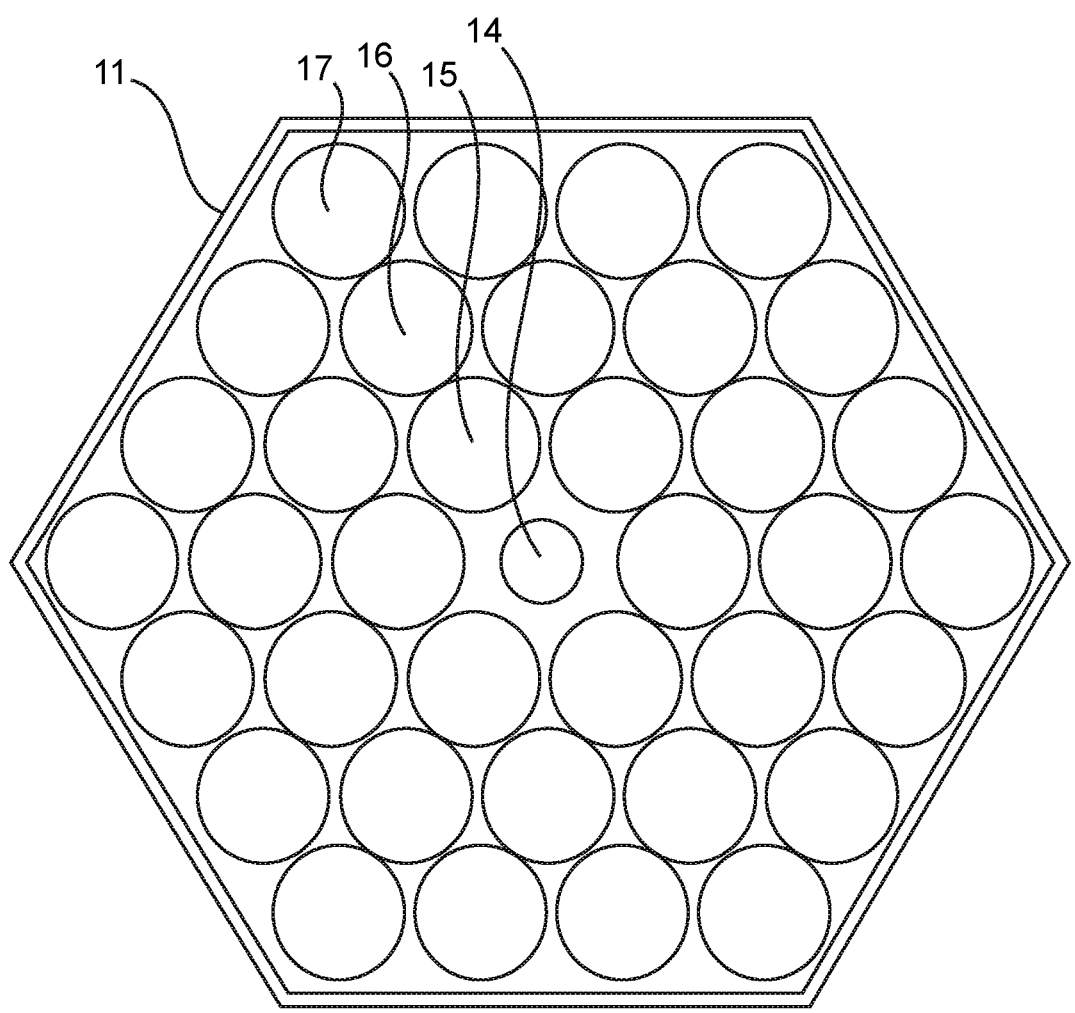
FIG. 2C is a top view of a hexagonal box with an arrangement of holes in a frame with a central hole and three concentric rings of holes adapted to receive thirty six vials.

In various embodiments, the hexagonal box measures from 50 mm to 200 mm, 55 mm to 150 mm, 60 mm to 100 mm, 65 mm to 75 mm or about 70 mm, across a diagonal between opposite intersections of the sides Each side may have a vertical height of from 30 mm to 100 mm, 35 mm to 55 mm, or about 40 mm. Each side of the hexagonal box may be from 30 mm to 112 mm wide, 32 mm to 75 mm wide or about 35 mm wide. Cryovials of smaller or larger diameter can be accommodated by increasing or decreasing the number of concentric rings of holes adapted to receive the cryovials. Standard, commercially available cryovials measure 12.5 mm in diameter and are designed to hold from 1 to 5 mL of sample. As shown in FIG. 2B, for a standard cryovial designed to hold 2.0 mL of sample, the frame of the hexagonal box comprises 2 concentric rings of holes [15, 16] accommodating 18 cryovials, each side of the hexagonal box measures 35 mm wide and may be 57 mm tall. A taller hexagonal box can accommodate a taller cryovial. As shown in FIG. 2A, the frame can be configured to hold cryovials of larger diameter, typically 16.5 mm. In this case 1 concentric ring [15] is provided, accommodating 6 cryovials. Similarly, as shown in FIG. 2C, the frame can be adapted to receive cryovials of smaller diameter, typically 8.5 mm. In this case 3 concentric rings [15, 16, 17] are provided, accommodating 36 cryovials.

The frame is advantageously configured to hold cryovials within the hexagonal box. As shown in FIG. 1A, the frame fills the horizontal space between the 6 walls of the hexagonal box. It has a central axis [12] parallel to the walls of the hexagonal box. A hole [14] along the central axis is adapted to receive a rod [30]. As shown in FIG. 3 the rod [30] extends from the base of an insert [31] through each of the hexagonal boxes [10] in a stack. The frame comprises an array of holes parallel to the central axis, each hole adapted to hold a cryovial of a given diameter. The holes are arrayed around the central axis [12] in one or more concentric rings [15, 16, 17], and the number of holes in each concentric ring from a first innermost ring with 6 holes to an n outermost ring with 6n holes increases by 6. In an embodiment the frame is provided as a block, and the vertical dimension of the frame extends from the bottom end of the hexagonal box to at least half the distance to the first end of the hexagonal box. In an embodiment, the frame measures 5 to 10 mm vertically and the top of the frame is located equidistant from the first and second ends of the hexagonal box. The frame may be fabricated as an integral part of the hexagonal box or may be provided separately and affixed within the box.

Canister—

Turning now to FIG. 4, the system may additionally comprise a canister [40], a tubular container, typically fabricated from aluminum, stainless steel or plastic, with a central axis [44], an open top end and a closed or perforated bottom end. The canister is configured to receive a stacked multiplicity of hexagonal boxes, typically from 2-10 boxes in the stack, e.g., 4-8 hexagonal boxes, e.g., 6 hexagonal boxes (holding 8.5 mm diameter cryovials of 0.7 mL nominal capacity). The canister is dimensioned to receive the stack of hexagonal boxes such that the walls of the boxes [11] are in close proximity to the wall of the canister. The canister provides a means by which the stack of hexagonal boxes may be received into and removed from a cryogenic storage container. The cross-sectional geometry of the walls of the canister is circular (hereinafter, "circular canister" as shown in FIG. 4) or hexagonal (hereinafter, "hexagonal canister" as shown in FIG. 5).

Turning now to FIG. 3, in an embodiment the system also comprises an insert with a base [31]. The base is a platform configured to fit within and parallel to the bottom of the canister [40] and move up and down through the canister, thereby lifting and lowering the stack of hexagonal boxes resting upon the platform and within the canister (as shown in FIG. 4). The insert additionally comprises a rod [30], affixed and located centrally on the base of the insert and extending vertically along the long axis [44] of the canister and parallel to the canister walls. Each of the hexagonal boxes is configured to accept the passage of the rod [30] through a hole [14] that is located central to the cross-section of the box frame and opening vertically through the frame. The rod has a diameter of 5-10 mm, e.g., 6-8 mm and may extend to within 0-10 mm of the top of the canister. In an embodiment of a hexagonal box, the diameter of the hole receiving the passage of the rod is smaller than the diameter of the holes receiving the cryovials, thereby preventing the inadvertent loading of a cryovial into the central hole configured to receive the rod and the retention of all cryovials in the box by the lid [20] when inverted since the slot [21] in the lid configured to fit around the rod [30] is narrower than the diameter of a cryovial. In an embodiment, the canister additionally comprises an arm [41] affixed to the canister side and extending vertically beyond the top of the canister, useful for raising and lowering the canister within the cryogenic compartment. In an embodiment, this arm [41] is permanently affixed to the canister such that, in the case of small dry shippers, it is used for holding a single stack of hexagonal boxes.

Figure 5A:
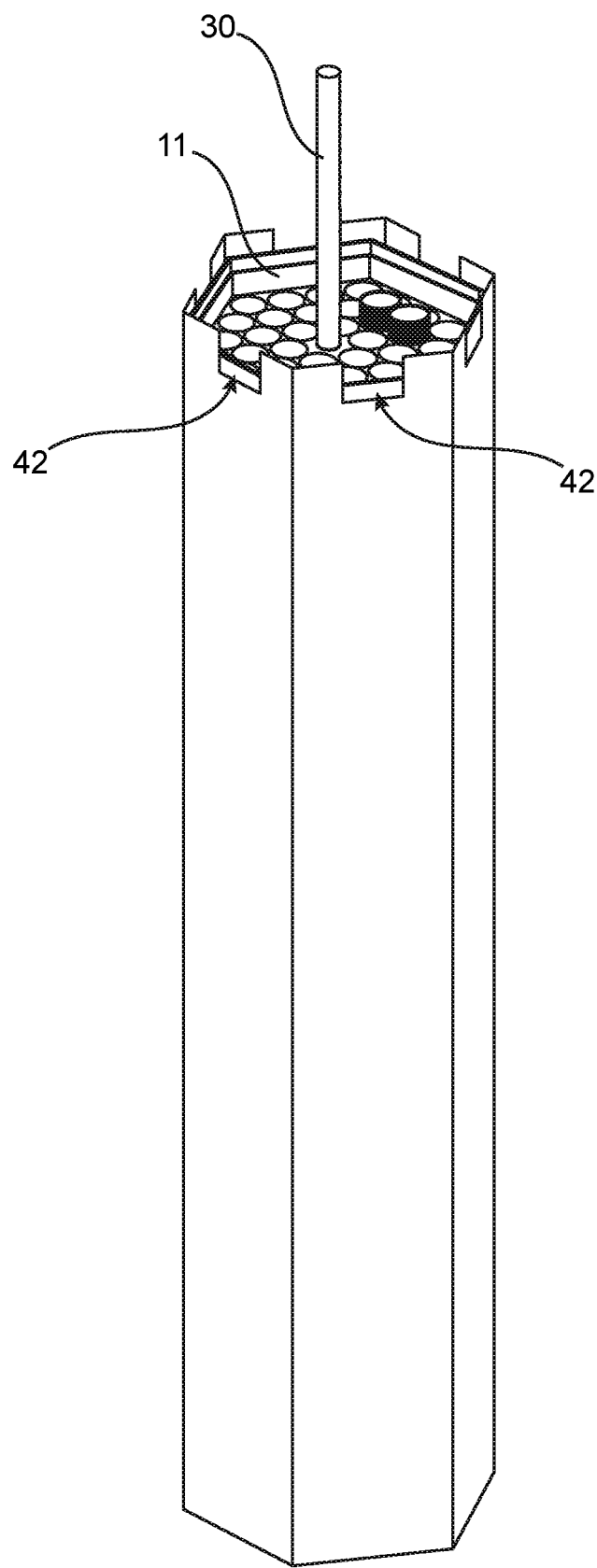
FIG. 5A is a perspective of a hexagonal canister with a castellated top having a notch in each of the six sides containing an insert with a stack of hexagonal boxes and showing two cryovials in the frame of the topmost box.

As shown in an embodiment depicted in FIG. 5, a hexagonal canister is employed. The top edge of the hexagonal canister may be castellated with spaced notches [42], typically regularly spaced rectangular notches, and typically one notch in each of the six sides of the hexagonal canister walls. The function of the castellation will become clear in the description of the methods of use, below.

Efficiency—

An advantage of the cryovial storage system provided herein is the increase in the efficiency of cryovial storage and transport within cryogenic freezers and dry shippers over that previously available using conventional storage means.

TABLE 1

| Storage box | Conventional Square | Exemplary New Hexagonal Arrangement |
| --- | --- | --- |
| LNVP Cryobank (eg CBS V1500 isothermal LN2 freezer, 533 mm ID x 724 mm deep Standard 2.0 mL cryovial, 12.5 mm diameter | | |
| Dimensions (mm) L x W x H | 146 x 146 x 45 | 70 diagonal x 45 |
| Number of cryovials/box | 81 | 18 |
| Number of racks | 7 | 52 |
| Number of shelves or levels/rack | 16 | 16 |
| Number of boxes | 112 | 832 |
| Total number 2.0 mL cryovials | 9,072 | 14,976 |
| Increase in efficiency by using hex boxes | — | 65% |
| LNVP Dry Shipper (eg Chart/MVE IATA Cryoshipper, 210 mm ID x 240 mm) Standard 2.0 mL cryovial, 12.5 mm diameter | | |
| Dimensions (mm) L x W x H | 146 x 146 x 45 | 70 diagonal x 45 |
| Number of cryovials/box | 81 | 18 |
| Number of racks/canister | 1 | 7 |

TABLE 1-continued

| Storage box | Conventional Square | Exemplary New Hexagonal Arrangement |
|---|---|---|
| Number of shelves or levels/rack | 6 | 6 |
| Number of boxes | 6 | 42 |
| Total number 2.0 mL cryovials | 486 | 756 |
| Increase in efficiency by using hex boxes | — | 55% |
| LNVP Dry Shipper (eg Taylor Wharton CXR 100, 91 mm ID chamber, 70 mm canister × 240 mm) Standard 2.0 mL cryovial, 12.5 mm diameter | | |
| Dimensions (mm) L × W × H | 146 × 146 × 45 | 70 diagonal × 45 |
| Number of cryovials/sleeved cane or/box | 6 | 18 |
| Number of canes/canister or racks/canister | 14 | 1 |
| Number of canes or boxes | 14 | 6 |
| Total number 2.0 mL cryovials | 84 | 108 |
| Increase in efficiency by using hex boxes | — | 28% |

TABLE 2

| Storage box | Conventional Rectangular | Exemplary New Hexagonal Arrangement |
|---|---|---|
| LNVP Cryobank (eg CBS V1500 isothermal LN2 freezer, 533 mm ID × 724 mm deep SBS-format cryovials 8.5 mm diameter, 0.7 mL volume | | |
| Dimensions (mm) L × W × H | 137 × 95 × 45 | 70 diagonal × 45 |
| Number of cryovials/box | 96 | 36 |
| Number of racks | 14 | 52 |
| Number of shelves or levels/rack | 16 | 16 |
| Number of boxes | 224 | 832 |
| Total number 0.7 mL cryovials | 21,504 | 29,952 |
| Increase in efficiency by using hex boxes | — | 39% |
| LNVP Dry Shipper (eg Chart/MVE IATA Cryoshipper, 210 mm ID × 240 mm) SBS-format cryovials 8.5 mm diameter, 0.7 mL volume | | |
| Dimensions (mm) L × W × H | 137 × 95 × 45 | 70 diagonal × 45 |
| Number of cryovials/box | 96 | 36 |
| Number of racks/canister | 1 | 7 |
| Number of shelves or levels/rack | 6 | 6 |
| Number of boxes | 6 | 42 |
| Total number 0.7 mL cryovials | 576 | 1,512 |
| Increase in efficiency by using hex boxes | — | 162% |
| LNVP Dry Shipper (eg Taylor Wharton CXR 100, 91 mm ID canister × 240 mm) SBS-format cryovials 8.5 mm diameter, 0.7 mL volume | | |
| Dimensions (mm) L × W × H | 137 × 95 × 45 | 70 diagonal × 45 |
| Number of cryovials/sleeved cane or/box | 6 | 36 |
| Number of canes/canister or racks/canister | 14 | 1 |
| Number of canes or boxes | 6 | 6 |
| Total number 0.7 mL cryovials | 36 | 216 |
| Increase in efficiency by using hex boxes | — | 157% |

As shown in Table 1, 12.5 mm OD/2.0 mL cryovial organization using the hexagonal boxes with a 70 mm diagonal and ~45 mm vertical dimensions of the cryovial storage system of the present invention, advantageously results in a greater number of 12.5 mm OD/2.0 mL cryovials that can be contained within a LNVP cryobank, a 210 mm ID LNVP dry shipper and a 91 mm ID LNVP dry shipper than can be achieved using conventional square format boxes. Similarly, as shown in Table 2, 8.5 mm OD/0.7 mL cryovial organization using the hexagonal boxes of the cryovial storage system of the present invention advantageously results in a greater number of 8.5 mm OD/0.7 mL cryovials that can be contained within a LNVP cryobank, a 210 mm ID LNVP dry shipper and a 91 mm ID LNVP dry shipper than can be achieved using conventional rectangular format boxes. In current practice, 12.5 mm OD/2.0 mL cryovials are stored in square format boxes and 8.5 mm OD/0.7 mL cryovials are stored in rectangular format boxes.

The hexagonal box storage system developed by the inventor significantly improves upon these square or rectangular storage systems, as evidence by the data in Tables 1 and 2.

Using the system and hexagonal boxes in accordance with the present invention with a 70 mm diagonal and ~45 mm vertical dimensions of the current invention, 756 standard 2.0 mL cryovials or 1,512 of the 0.7 mL 8.5 mm diameter cryovials could be accommodated in a large dry shipper. This represents a significant increase in storage/transportation efficiency of 55% and 162%, respectively, for the two common types of cryovials over conventional approaches in the industry. Similarly, the increase in efficiency using a small dry shipper is 28% and 157% respectively, and in a Cryobank LNVP freezer, 65% and 39% respectively.

Figure 4A:
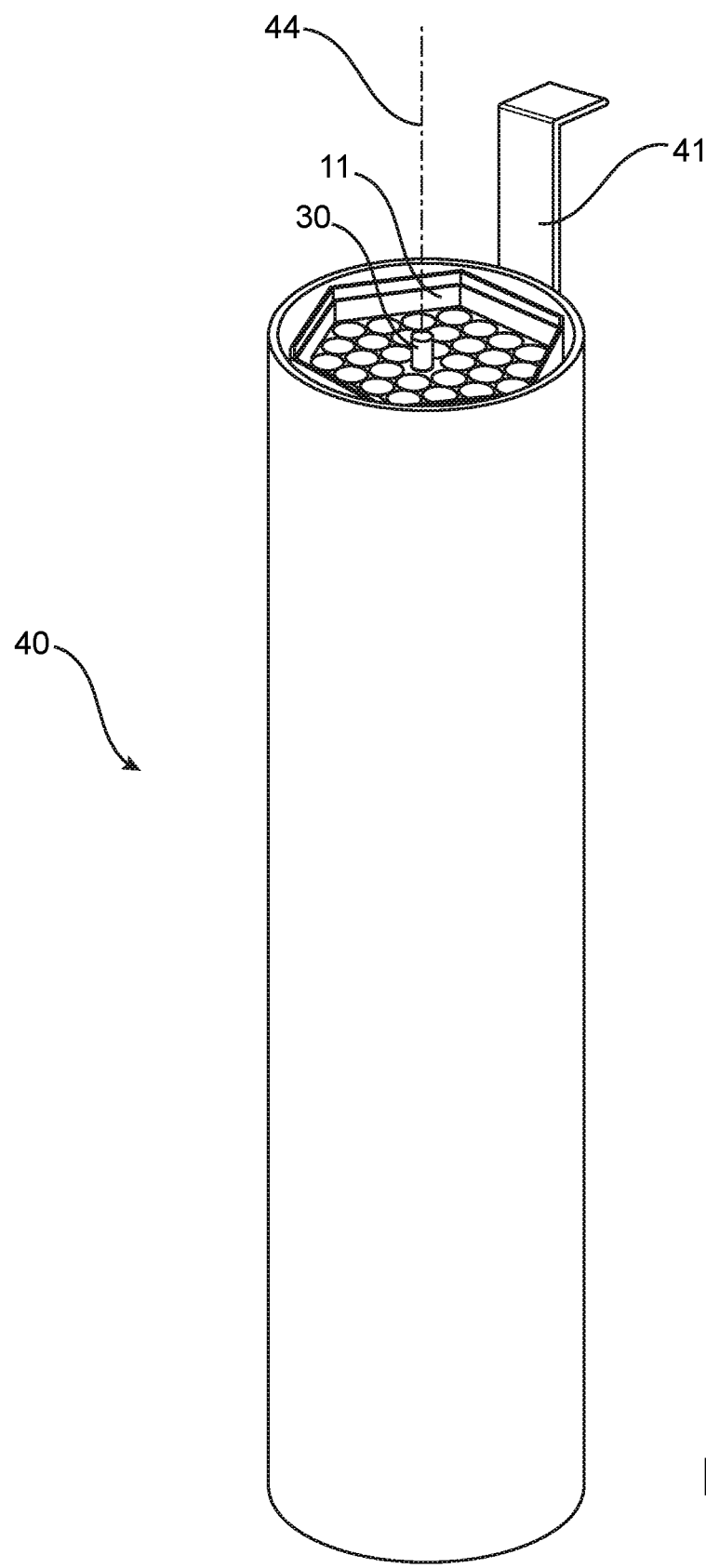
FIG. 4A is a perspective of a circular canister containing an insert with a stack of hexagonal boxes.

In one embodiment as shown in FIG. 4A, the cryovial storage system has a canister [40] that is substantially cylindrical having a circular cross-section, with an interior void that includes a substantially cylindrical volume, and one or more hexagonal boxes [11], each with a rod hole and a plurality of vial holes that are circles and each vial hole having a consistent diameter D. In an embodiment, the number of vial holes having a diameter D that can be accommodated by the frame of the hexagonal box that can be placed into the void of the canister is greater than the number of vial holes having the same diameter D that could be accommodated by a frame of a rectangular box that could be placed into the void of the canister. In another embodiment, the frame of the hexagonal box that can be placed into the void of the canister can accommodate a greater density of vial holes having diameter D than the density of vial holes having diameter D that could be accommodated by a frame of a rectangular box that could be placed into the void of the canister.

Method of Use—

Figure 4B:
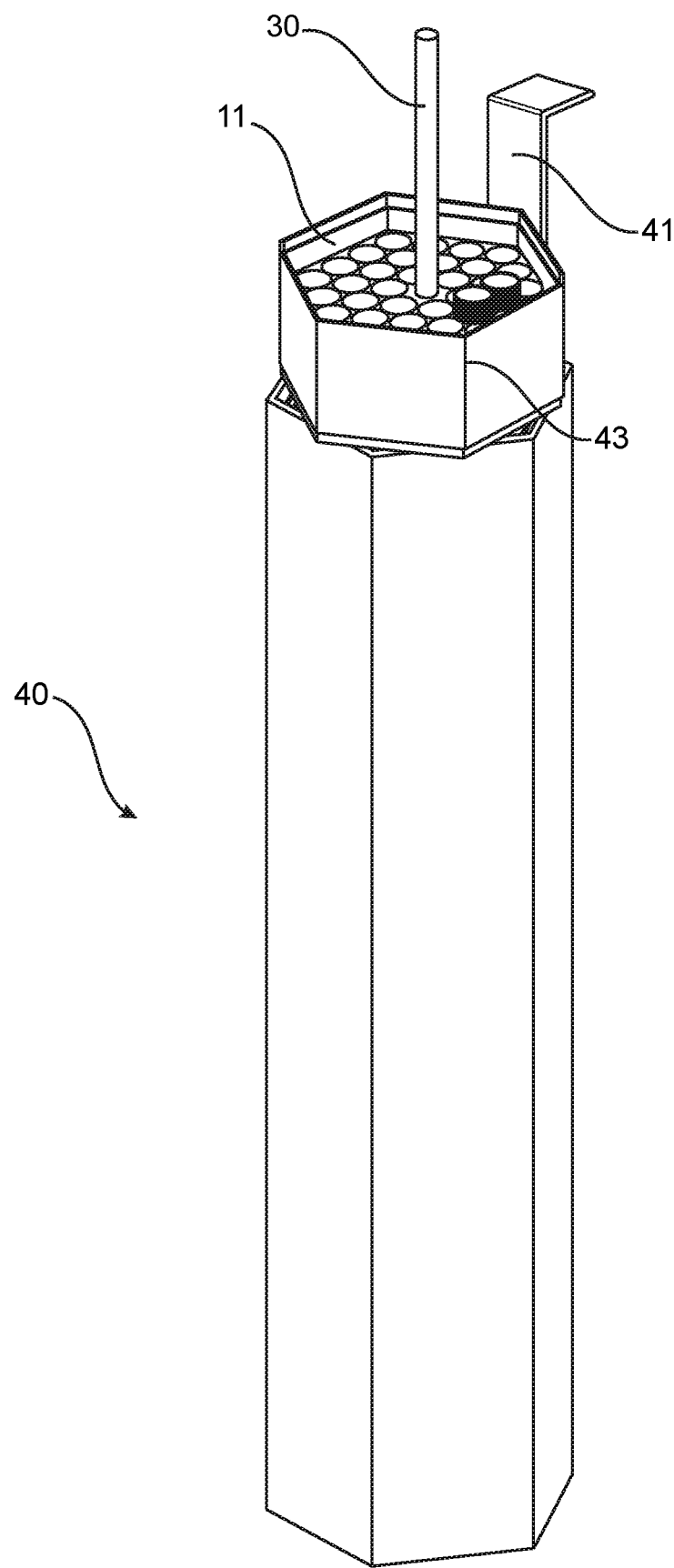
FIG. 4B is a perspective of a hexagonal canister containing an insert with a stack of hexagonal boxes and the topmost box turned to rest on the sides of the canister.

Also provided is a method of using the cryovial storage system comprising a multiplicity of stacked hexagonal boxes in conjunction with a hexagonal canister to easily access 1 or more vials in the topmost hexagonal box from a dry shipper, with minimal change to the temperature of the remaining vials in the other hexagonal boxes, and retaining the active hexagonal box in use to always be at the topmost location until all cryovials have been removed for use. This method advantageously allows dry shippers to be used in clinical settings to access individual vials for administration of samples contained therein to patients. In this method, a multiplicity of hexagonal boxes are placed on the central rod of the insert of a hexagonal canister and stacked thereby. The canister is placed within the dry shipper and the dry shipper delivered to the clinic where it remains as the local repository during use in the clinic. To access one or more vials, the central rod is raised, thereby raising the stack of hexagonal boxes such that the bottom of the topmost box is raised above the top of the hexagonal canister. As shown in FIG. 4B, the topmost box is then rotated such that the intersecting sides (corners) [43] of the topmost box are above the top edges of the canister [40], and the topmost box is then lowered to rest upon the top of the canister. The remaining hexagonal boxes are then lowered within the canister by lowering the central rod, thereby leaving the topmost box sitting at the top of the canister. This is an advantage of using the hexagonal canister in this method. This method then allows the user to remove one or more vials from the topmost hexagonal box while maintaining optimal temperature of the remaining boxes in the stack. After the desired number of vials has been removed, the stack is raised within the canister to lift the topmost hexagonal box, the topmost hexagonal box is rotated to realign with the stack and the stack is lowered back into the canister. Once all the vials in the topmost hexagonal box have been used, the box is removed from the stack and the method is repeated for the next lower box in the stack. All boxes, including the topmost that is being accessed, are thereby maintained within the correct temperature limitations. Having each box accessible in turn from this top position means that the operator doesn't have to delve deep into the dry shipper to retrieve vials—they are always available at the top location when being accessed.

Figure 5B:
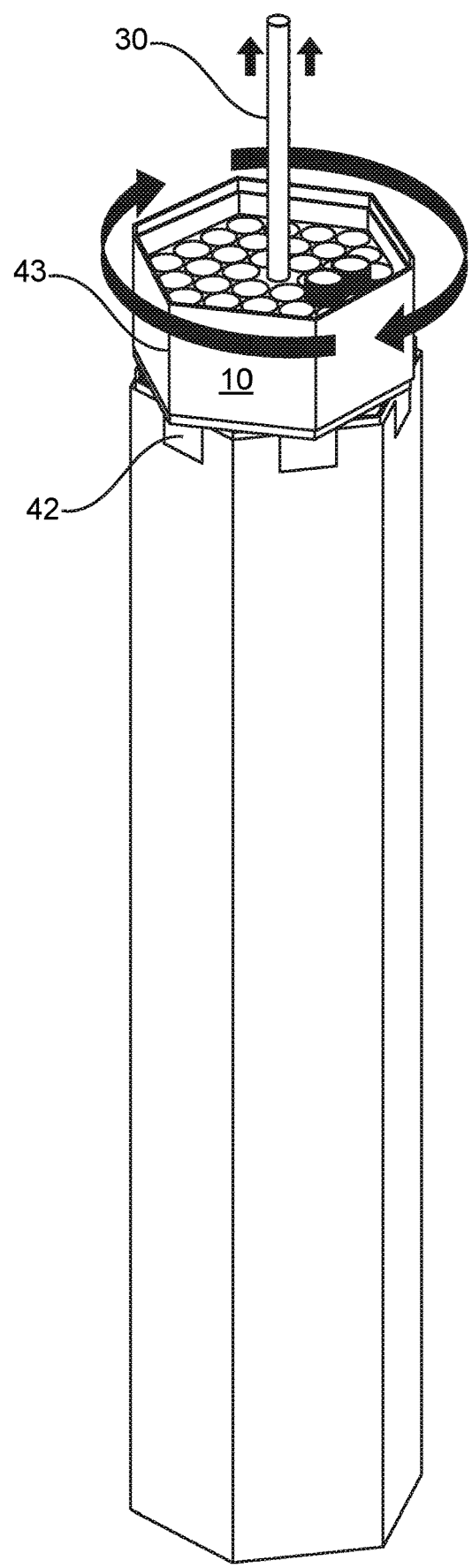
FIG. 5B depicts the lifting of the stack on the insert and turning of the topmost hexagonal box around the rod of the insert.
Figure 5C:
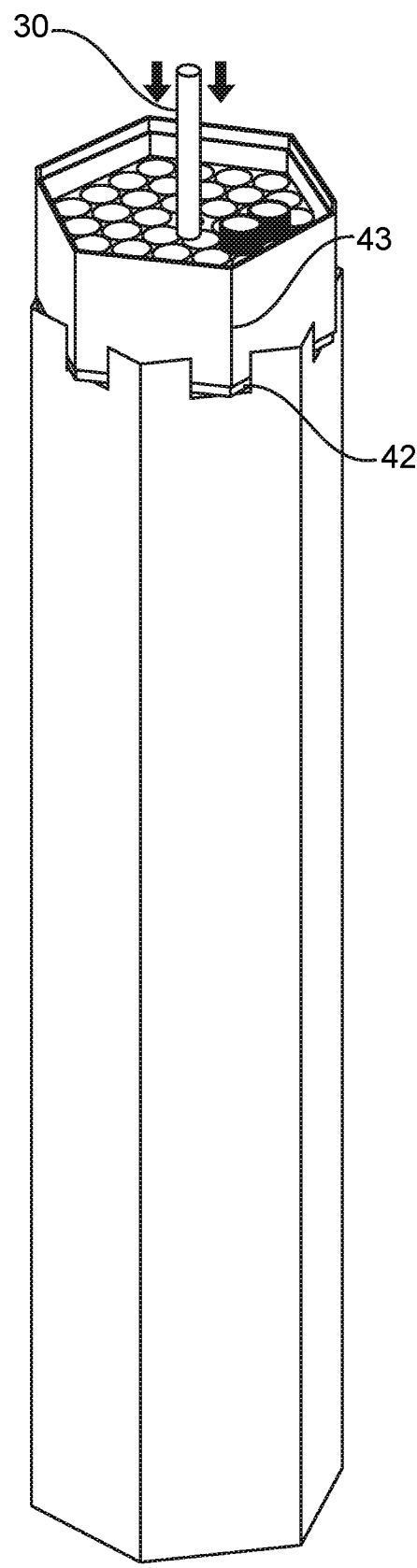
FIG. 5C depicts the lowering of the remaining boxes in the stack and the locating of the corners of the topmost box within the notches of the castellation.

In an embodiment, the top of the hexagonal canister is castellated as shown in FIG. 5. In an embodiment there is 1 rectangular notch [42] at the top of each of the 6 sides of the canister. In the method described and as depicted in FIG. 5B, the stack is raised and rotated such that the corner of each intersecting side [43] of the topmost hexagonal box [10] is over a notch [42] and as shown in FIG. 5C, the hexagonal box can be lowered to sit within the notches. This removably holds the hexagonal box in place on top of the canister and prevents the inadvertent movement or release of the box.

Once all the cryovials are removed/retrieved from the topmost box, the empty topmost box may be removed from the stack and the next lower box can be elevated and retained by the castellations for ease of access of the vials in this next lower box, thereby each newly accessed box can be retained.

Interchangeability of Hexagonal Boxes Between Cryogenic Storage Freezers and Dry Shippers—

An advantage of the cryovials storage system of the present invention over those conventionally used is the modular use of the hexagonal boxes [10], and the stacks of hexagonal boxes on inserts (FIG. 3) within hexagonal canisters (FIG. 4A), when: a) stored in LNVP cryobank freezers; b) transferred to dry shippers for transport to clinical sites; and c) finally, use of the same dry shippers and cryovial system to provide vials one by one for use in clinical settings. For example, a cryobank freezer can be filled with full height hexagonal canisters [40] that in turn are filled with multiple unit stacks of hexagonal boxes [10] on inserts. If a small dry shipper is used a single unit stack from a full height hexagonal canister can be transferred. If a large dry shipper is used, 7 unit stacks on inserts as configured in Example 4 (in this case without individual hexagonal canisters) may be employed. Once the dry shipper is transported and received at a clinic, the methods of use provided above may be employed to retrieve vials one by one for use. In an embodiment, a castellated canister (used in a small dry shipper) or an array of 7 castellated canisters (used in a large dry shipper) and method of use is employed as depicted in FIG. 5.

While the present disclosure is primarily directed to storage systems configured for use with cryovials, in an alternative embodiment, storage systems may also be configured for use with non-cryovials or other storage vessels.

EXAMPLES

Example 1

As shown in FIG. 2A, the frame of a hexagonal box that measures 70 mm across the diagonal between opposite intersections of sides can be adapted to receive vials with a diameter of approximately 16.5 mm. In such a configuration, 1 circle of 6 vials/box can be accommodated.

Example 2

As shown in FIG. 2B, the frame of a hexagonal box that measures 70 mm across the diagonal between opposite intersections of sides can be adapted to receive vials with a diameter of approximately 12.5 mm. In such a configuration, 2 concentric circles totaling 18 vials can be accommodated.

Example 3

As shown in FIG. 2C, the frame of a hexagonal box that measures 70 mm across the diagonal between opposite intersections of sides can be adapted to receive vials with a diameter of approximately 8.5 mm. In such a configuration, 3 concentric circles totaling 36 vials can be accommodated.

Example 4

Large dry shippers have a payload compartment that measures about 210 mm in diameter and 240 mm deep. A large dry shipper can be used with a circular canister that is configured to fit snuggly within the large dry shipper payload compartment and as shown in FIG. 6, stacks of hexagonal boxes on inserts can be configured to fit snuggly within the large circular canister. As shown, 7 stacks of 6 70 mm hexagonal boxes each, totaling 42 boxes of 1,512 8.5 mm diameter vials fit comfortably within a standard large dry shipper, and when each stack is accommodated with its own hexagonal canister, this configuration permits sequential access to each vial in the dry shipper. Compared to the use of boxes with rectangular formats, this represents a 162% increase in efficiency (See Table 2).

What is claimed is:

1. A cryovial storage system comprising:
   a hexagonal box configured for receiving cryovials, the box comprising:
      an open top end;
      a bottom end;
      six intersecting sides positioned there between; and
      a frame with a central axis parallel to the sides, the frame comprising:
         a rod hole centered on the central axis and through the frame, the rod hole further configured to receive a rod; and
         an array of vial holes configured to hold cryovials arrayed around the central axis in one or more concentric rings, each concentric ring from innermost to outermost comprising increasing numbers of holes starting at six, and increasing by six in each concentric ring; and
   a base disposed below the box, wherein a rod is affixed to the base and extends upwardly through the rod hole of the hexagonal box.

2. A cryovial storage system comprising:
   a hexagonal box configured for receiving cryovials, the box comprising:
      an open top end;
      a bottom end;
      six intersecting sides positioned there between; and
   a unitary, planar frame with a central axis parallel to the sides, the frame comprising:
      a rod hole centered on the central axis and disposed through the frame, the rod hole further configured to receive a rod; and
   an array of vial holes configured to hold cryovials arrayed around the central axis in one or more concentric rings, each concentric ring from innermost to outermost comprising increasing numbers of holes wherein the frame comprises n concentric rings and $3*n*(n+1)$ holes.

3. The cryovial storage system of claim 1 or 2, wherein the frame comprises a first ring of six holes.

4. The cryovial storage system of claim 3, wherein the frame comprises a second ring distal from the central axis, the second ring comprising 12 holes.

5. The cryovial storage system of claim 4, wherein the frame comprises a third ring distal from the central axis, the third ring comprising 18 holes.

6. The cryovial storage system of claim 1, further comprising:
   a canister with an open top end;
   a bottom end;
   a sidewall positioned there between,
   wherein the canister wall has a circular or hexagonal cross section,
   wherein the canister is configured to receive the hexagonal box and the base and rod, the hexagonal box configured to removably fit within the canister, such that the sides of the hexagonal box are parallel to and in proximity to the sidewall of the canister.

7. The cryovial storage system of claim 6, further comprising a stacked multiplicity of hexagonal boxes.

8. The cryovial storage system of claim 6, wherein the cross section of the canister is circular.

9. The cryovial storage system of claim 6, wherein the cross section of the canister is hexagonal.

10. The cryovial storage system of claim 6, wherein the canister is hexagonal.

11. The cryovial storage system of claim 10, wherein the open top end of the canister is castellated with six regularly spaced notches, each within a side of the canister, and each notch is configured to receive an intersecting corner of the hexagonal box when the hexagonal box is placed within the notches.

12. The method of claim 11 comprising a castellated open top end of the canister, with six regularly spaced notches, each within a side of the canister, and each notch adapted to receive the corner of intersecting sides of the hexagonal box.

13. A method of accessing vials from the hexagonal box of claim 10 comprising:
   a. raising the rod vertically thereby lifting the stack of hexagonal boxes such that the bottom of the topmost hexagonal box in the stack is above the open top end of the canister;
   b. rotating the topmost hexagonal box around the rod such that each pair of intersecting sides of the topmost box rests upon an edge of the canister;
   c. lowering the rod back into the canister; and
   d. removing cryovials from the topmost hexagonal box.

14. The cryovial storage system of claim 1, wherein a plurality of hexagonal boxes are configured to be stacked upon the base such that the rod passes through the rod holes of the hexagonal boxes.

15. A cryovial storage system comprising:
   a hexagonal box, the hexagonal box comprising:
      six sidewalls;
      a base coupled to the sidewalls; and
      a frame coupled to the base and sidewalls, wherein the frame defines a plurality of vial holes configured for holding cryovials, and wherein the frame further defines a central channel; and
   a canister, the canister comprising:
      a sidewall having an inner surface and an outer surface;
      a base coupled to the sidewall; and
      an interior void defined by the sidewall inner surface and the base, wherein the interior void is configured such that the hexagonal box can be placed within the interior void.

16. The cryovial storage system according to claim 15, wherein the base further comprises an upwardly projecting rod extending vertically through the void, and wherein the central channels of the frames of the hexagonal boxes are configured for slideably receiving the rod when the hexagonal boxes are placed within the interior void.

17. The cryovial storage system according to claim 16, wherein the canister comprises a hexagonal cross-sectional structure, and wherein the canister comprises six discrete sidewalls.

18. The cryovial storage system according to claim 17, wherein the six sidewalls extend upward to form a topmost edge, and wherein the six sidewalls include a plurality of castellations, one per sidewall, among them projecting downward from the topmost edge of each sidewall.

19. The cryovial storage system according to claim 18, wherein each of the six sidewalls includes a single one of the plurality of castellations.

20. The cryovial storage system according to claim 19, wherein each one of the plurality of castellations is rectangular, centered in the sidewall of the canister and measuring ⅓ of the width of one side of the hexagonal box with a vertical dimension equivalent to the height of one hexagonal box or a portion of the height thereof.

21. The cryovial storage system according to claim 20, wherein the hexagonal box is a first hexagonal box, the cryovial storage system further comprising:
a second hexagon box configured similarly to the first hexagonal box,
wherein the first and second hexagonal boxes are configured to be stacked on top of one another and for slideably receiving the rod through their central channels.

22. The cryovial storage system according to claim 21, wherein the first hexagonal box is configured to be stacked on top of the second hexagonal box in a first configuration where faces of the six sidewalls of each of the first and second hexagonal boxes are aligned with one another.

23. The cryovial storage system according to claim 22, wherein the first hexagonal box is configured to rest upon the castellations of the canister above the second hexagonal box in a second configuration where the faces of the six sidewalls of each of the first and second hexagonal boxes are offset from one another.

24. The cryovial storage system according to claim 23, wherein the first hexagonal box is moved from the first configuration to the second configuration by elevating the rod and then rotating first hexagonal box about the rod before being placed to rest upon the castellations of the canister.

25. The cryovial storage system according to claim 15, wherein the canister is substantially cylindrical having a circular cross-section, wherein the interior void comprises a substantially cylindrical volume, and wherein the plurality of vial holes are circles having a consistent diameter D.

26. The cryovial storage system according to claim 25, wherein the number of vial holes having a diameter D that can be accommodated by the frame of the hexagonal box that can be placed into the void of the canister is greater than the number of vial holes having the same diameter D that could be accommodated by a frame of a rectangular box that could be placed into the void of the canister.

27. The cryovial storage system according to claim 25, wherein the frames of a plurality of hexagonal boxes are configured to be placed into the void of the canisters in the payload compartment of the dry shipper or cryobank, and are configured to accommodate a greater density of vial holes having diameter D than the density of vial holes having diameter D than could be accommodated by the frames of rectangular boxes that could be placed into the void of the dry shipper or cryobank.

* * * * *